United States Patent [19]

Hamann

[11] Patent Number: 5,976,013
[45] Date of Patent: Nov. 2, 1999

[54] DEVICE FOR PREVENTING ACCUMULATION OF GRAIN IN COMBINE HARVESTER

[75] Inventor: Gerhard Hamann, Harsewinkel, Germany

[73] Assignee: Claas Selbstfahrende Erntemaschinen GmbH, Harsewinkel, Germany

[21] Appl. No.: 09/118,099

[22] Filed: Jul. 17, 1998

[30] Foreign Application Priority Data

Jul. 17, 1997 [DE] Germany ............... 197 30 701

[51] Int. Cl.⁶ .................................. A01D 17/02
[52] U.S. Cl. .............................. 460/114; 56/14.5
[58] Field of Search .................. 460/114, 119; 56/14.5, 153, 131, 122

[56] References Cited

U.S. PATENT DOCUMENTS

| | | | |
|---|---|---|---|
| 2,606,647 | 8/1952 | Anderson et al. | 198/204 |
| 3,203,430 | 8/1965 | Lorenzen et al. | 460/114 |
| 3,282,404 | 11/1966 | Corwith et al. | 198/167 |
| 3,780,851 | 12/1973 | Bichel et al. | 198/175 |
| 3,945,178 | 3/1976 | Delfosse et al. | 460/114 |
| 3,967,719 | 7/1976 | Kloefkorn et al. | 460/114 |
| 4,305,244 | 12/1981 | Seymour et al. | 460/114 |
| 4,640,085 | 2/1987 | Rupprecht | 56/14.6 |
| 4,787,400 | 11/1988 | Tanis | 460/114 |
| 4,908,002 | 3/1990 | Tanis | 460/114 |
| 5,273,488 | 12/1993 | Hollevoet | 460/119 |
| 5,478,277 | 12/1995 | Kloefkorn | 460/114 |
| 5,480,352 | 1/1996 | Luscombe | 460/114 |
| 5,496,215 | 3/1996 | Underwood et al. | 460/114 |

FOREIGN PATENT DOCUMENTS

| | | |
|---|---|---|
| 886 557 | 1/1981 | Belgium . |
| 12 45 195 | 5/1964 | Germany . |
| 110147 | 2/1974 | Germany . |
| 33 24 898 | 7/1983 | Germany . |
| 34 06 696 C3 | 2/1984 | Germany . |
| 41 32 246 A1 | 9/1991 | Germany . |
| 1 451 755 | 10/1976 | United Kingdom . |

*Primary Examiner*—Thomas B. Will
*Assistant Examiner*—Ardad Fabian Kovacs
*Attorney, Agent, or Firm*—Husch & Eppenberger, LLC; Robert E. Muir

[57] ABSTRACT

A combine harvester has a conveying channel for conveying crop material from the combine harvester's cutting mechanism to its threshing mechanism. The conveying channel has several conveying chains, which are guided on a lower deflection drum and on sprockets arranged on an upper drive shaft. A plurality of raking pins extend at a distance on both sides of the combine harvester, roughly parallel to the chain links, and provide a means for preventing the accumulation of grain in the region of upper deflection in the combine harvester. The raking pins have their free ends that protrude beyond the chain links. Furthermore, the raking pins advantageously are constructed as bolts which are attached along with the conveying bars to the conveying chains.

8 Claims, 3 Drawing Sheets

DEVICE FOR PREVENTING ACCUMULATION OF GRAIN IN COMBINE HARVESTER

BACKGROUND OF THE INVENTION

The present invention relates generally to agricultural machinery and, more particularly, to improvements to combine harvesters for agricultural crops.

Combine harvesters have a cutting mechanism, a threshing mechanism and a conveying channel for transferring crop material from the cutting mechanism to the threshing mechanism. Various designs for combine harvester conveying channels are known. Conveying channels are generally obliquely arranged channel housings which are pivotally connected to the machine frame of a combine harvester. Revolving conveying chains and conveying bars are connected to the machine and convey the crop material in an undershot manner to the threshing device, as described in German Patent 3 406 696 2. The conveying chains are entrained over sprockets which are fixed to the upper drive shaft and which simultaneously deflect the chains. A disadvantage of this design is that in the region of these sprockets, and particularly on their side flanks, crop material accumulates and jams between the moving and stationary components. This occurs particularly in the case of moist crop material and causes the conveying chains to be lifted off the teeth of the sprockets during harvesting operation. Consequently, the conveying chains skip, causing skewing and the uncertainty of synchronous running of the individual chain runs with each other. Also stress arises within the conveying chain, which may cause it to break and damage the machine, resulting in machine failure.

It is an object of the invention to provide a design for the conveying chains that avoids the accumulation of crop material in the region of upper deflection (i.e. the upper rear terminus of the conveying chains), allowing for more trouble free operation of the harvesting machine.

SUMMARY OF THE INVENTION

In accordance with the present invention there is provided a combine harvester for agricultural crops and having a cutting mechanism, a threshing mechanism, a conveyor for transferring crop material from the cutting mechanism to the threshing mechanism, the conveyor including a plurality of conveying chains entrained over sprockets and conveying bars connected to and extending between the conveying chains, and a plurality of raking pins mounted on the conveying chains for precluding the accumulation of crop material in the region of the upper rear terminus of the conveying chains.

The embodiment of the present invention provides a technically simple means to preclude the accumulation of crop material in the region of upper deflection of the conveying chains, thus ensuring trouble-free and reliable operation of the conveying channel.

BRIEF DESCRIPTION OF THE DRAWINGS

Reference is now made to the drawings which illustrate a preferred embodiment of the invention and wherein.

DETAILED DESCRIPTION

Figure 1:
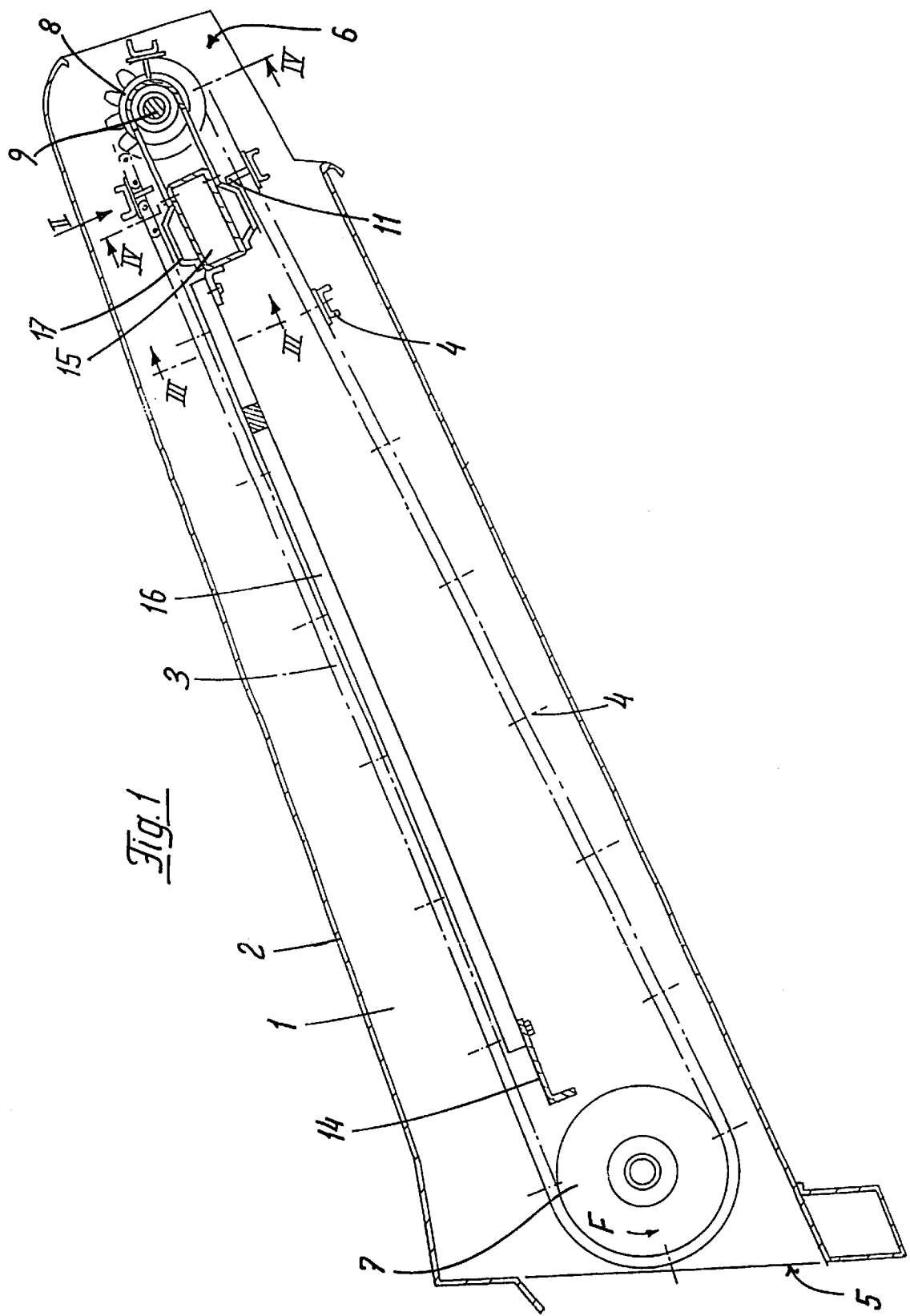
FIG. 1 is a schematic longitudinal sectional view of a conveying channel.
Figure 2:
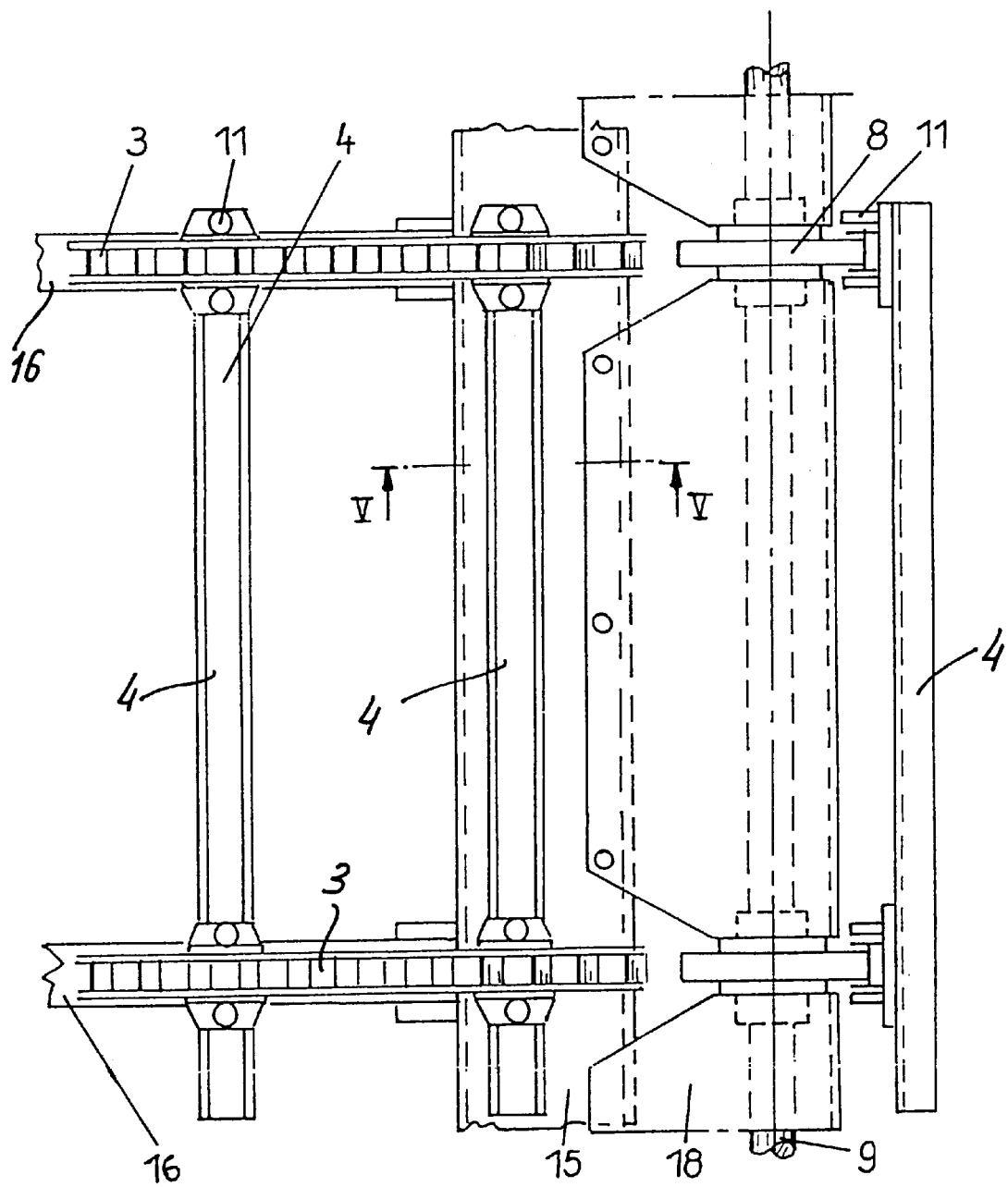
FIG. 2 is a top elevation as seen in the direction of arrow II in FIG. 1.
Figure 5:
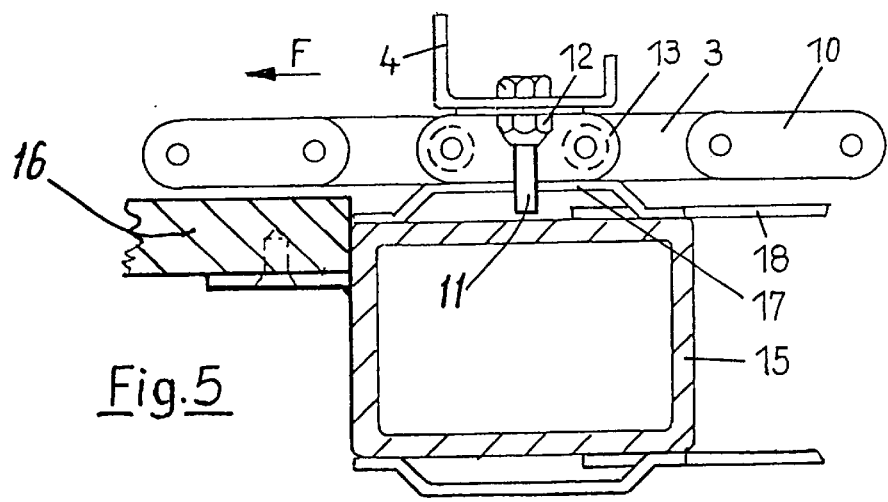
FIG. 5 is a partial longitudinal sectional view taken generally along line V—V in FIG. 2.

FIG. 1 shows an obliquely and upwardly extending conveying channel 1 for transferring crop material from a cutting mechanism to a threshing mechanism of a combine harvester, not shown. The conveying channel 1 comprises essentially a channel housing 2 and several longitudinally extending conveying chains 3 between which conveying bars 4 are mounted. The direction of movement of the conveying chains 3 is marked F. The channel housing 2 comprises a receiving opening 5 at the front of the combine harvester, adjacent the cutting mechanism, and a discharge opening 6, which adjoins the threshing mechanism. The conveying chains 3 are guided on a lower deflection drum 7 and on upper sprockets 8 arranged on a drive shaft 9. Attached to the conveying chains 3 are a plurality of raking pins (hereinafter described) which extend on both sides at a distance and parallel to chain links 10 which are best shown in FIG. 5. The free, inwardly directed ends of the rakes project beyond the chain links 10. As the raking pins move with the conveying chains 3 in direction F, variously profiled entraining elements may be used to exert a conveying action on the crop material.

Figure 3:
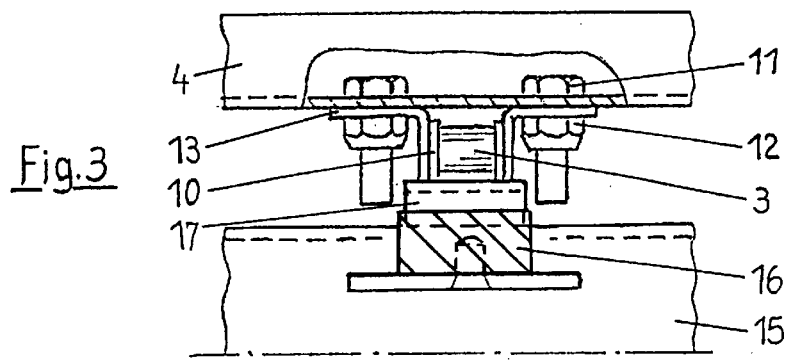
FIG. 3 is a cross sectional view taken generally along line III—III in FIG. 1.
Figure 4:
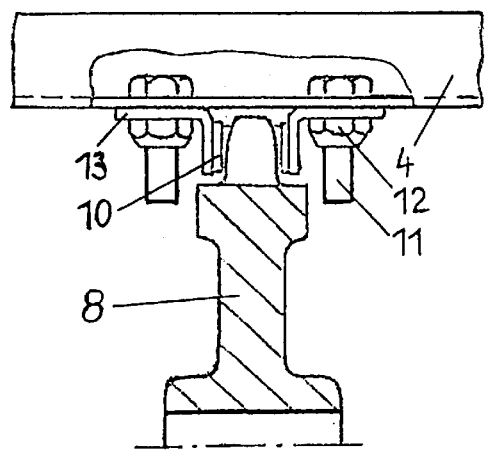
FIG. 4 is a cross sectional view taken generally along broken line IV—IV in FIG. 1.

In the preferred embodiment shown, the raking pins are designed as bolts 11 which also fix the conveying bars 4 to the conveying chains 3. As shown in FIGS. 3–5, the fork-shaped conveying bars 4 are affixed to angle straps 13, which are mounted on both sides of the conveying chains 3, by means of bolts 11 and nuts 12. The bolts 11 are extended so that their free ends protrude beyond the chain links 10, thus providing the raking effect. This design and arrangement allows the free shafts of the bolts 11 to act upon the crop material during the revolving movement of the conveying chains 4, thereby precluding the accumulation or wrapping of crop stems around the at-risk regions of the conveying channel components. Longitudinally extending guide bars 16, whose profile width is such that the bolts 11 laterally encompass or straddle the bar, extend between crossbeams 14, 15, below the conveying chains 3. As a result, the chain is further laterally guided as it moves between its terminal points. To equalize the difference in height between the upper crossbeam 15 and the inside of the conveying chain 3 and to avoid collision of the free ends of the bolts 11 with the crossbeam 15, spacer plates 17 are mounted on the upper and lower sides of the crossbeam 15, in the region of travel of the conveying chains 3. The height of the spacer plates 17 is such that the ends of the bolts 11 do not touch the surface of the crossbeam 15. Furthermore, the width of the distance plates 17 is slightly less than the inside distance between two adjacent bolts 11. Between the conveying chains 3, the upper drive shaft 9 is surrounded with a wrap protection plate 18 which is releasably attached to the upper crossbeam 15 and extends from the latter around the shaft 9. Hence the axial distance between the two adjacent sprockets 8 is bridged and the existing free spaces are covered.

Other objects, features and advantages will be apparent to those skilled in the art. While preferred and described, this has been by way of illustration and the invention should not be limited except as required by the scope of the appended claims.

I claim:

1. In an agricultural machine having a cutting mechanism, a conveyor for transferring a crop material from the cutting mechanism into the machine, and the conveyor including a plurality of conveying chains entrained over sprockets and conveying bars connected to and extending between the conveying chains; the improvement comprising:

a plurality of raking pins mounted on the conveying chains for precluding the accumulation of crop material in the region of an upper rear terminus of the conveying chains;

a longitudinal extending guide bar mounted under the upper flight of each conveying chain, and wherein pairs of said raking pins straddle the guide bar during the movement of the conveying chain; and a spacer plate mounted on each guide bar in the region of the upper terminus of the conveying chains.

2. An agricultural machine according to claim 1, wherein said raking pins are located at both sides of the conveying chains and generally parallel to the respective chain.

3. An agricultural machine according to claim 1, wherein said raking pins have free ends protruding beyond the links of the respective chain.

4. An agricultural machine according to claim 1, wherein said raking pins are constructed as profiled entraining elements.

5. An agricultural machine according to claim 1, wherein said raking pins are constructed as bolts.

6. An agricultural machine according to claim 5, wherein said bolts have free ends which protrude beyond the links of the respective chain.

7. An agricultural machine according to claim 6, wherein said bolts also connect the conveying bars to the conveying chains.

8. In a combine harvester for agricultural crops and having a cutting mechanism, a threshing mechanism, a conveyor for transferring crop material from the cutting mechanism to the threshing mechanism, and the conveyor including a plurality of conveying chains entrained over sprockets and conveying bars connected to and extending between the conveying chains; the improvement comprising:

a plurality of raking pins mounted on the conveying chains for precluding the accumulation of crop material in the region of an upper rear terminus of the conveying chains;

a longitudinal extending guide bar mounted under the upper flight of each conveying chain, and wherein pairs of said raking pins straddle the guide bar during the movement of the conveying chain; and a spacer plate mounted on each guide bar in the region of the upper terminus of the conveying chains.

* * * * *